2,607,887 S REFERENCE SEARCH ROO

Aug. 19, 1952 F. E. GISSLER ET AL 2,607,887

RADIO TELEPHONE SYSTEM

Filed April 22, 1950 4 Sheets-Sheet 1

INVENTORS: F. E. GISSLER
J. F. LAIDIG
BY
B. J. Stoddard
ATTORNEY

CROSS REFERENCE SEARCH ROO

Aug. 19, 1952 F. E. GISSLER ET AL 2,607,887

RADIO TELEPHONE SYSTEM

Filed April 22, 1950 4 Sheets-Sheet 2

INVENTORS F. E. GISSLER
J. F. LAIDIG
BY B. J. Stoddard
ATTORNEY

CROSS REFERENCE

INVENTORS: F. E. GISSLER
J. F. LAIDIG

BY B. F. Stoddard
ATTORNEY

CROSS REFERENCE SEARCH RO

Aug. 19, 1952 F. E. GISSLER ET AL 2,607,887

RADIO TELEPHONE SYSTEM

Filed April 22, 1950 4 Sheets-Sheet 4

INVENTORS: F. E. GISSLER
J. F. LAIDIG
BY B. Stoddard
ATTORNEY

UNITED STATES PATENT OFFICE 2,607,887

RADIO TELEPHONE SYSTEM

Frank E. Gissler, Denville, and John F. Laidig, Mine Hill Township, Morris County, N. J., assignors to Bell Telephone Laboratories, Incorporated, New York, N. Y., a corporation of New York Application April 22, 1950, Serial No. 157,598

23 Claims. (Cl. 250—6)

This invention relates to radio telephone communication systems and, more particularly, to a radio telephone system having an unattended coin box controlled radio telephone station located on a passenger vehicle which, throughout this specification, will be referred to as a railroad train but is not limited to this particular type of vehicle.

Since the route of the railroad train passes through certain geographic areas having no radio telephone facilities and in which radio telephone service is not available, it is desirable that the radio telephone station on the train be equipped with a readily discernible indicator which will be actuated only when the train is traveling through a zone in which radio telephone service is available. As the portion of the frequency spectrum that is assigned as a communication channel for use by the radio station on the train is also assigned for use by other radio stations, it is also desirable that the "telephone service available" indicator on the train be automatically controlled so that it will not be operated when the communication channel is being used by another radio station. Since there is no supervisory attendant at the radio station on the train, it is necessary to further control automatically the "telephone service available" indicator on the train so that it will not be operated when the instantaneous signal-to-noise ratio is not satisfactory for commercial use of the system by a passenger on the train. In addition, it is necessary that an operator at a radio terminal station be able to discontinue the operation of the radio transmitter on the train by remote control after it has inadvertently been left in operation due to failure to restore the train telephone instrument to its holder.

Accordingly, it is an object of this invention to provide a radio telephone mobile station with an indicator which will be operated automatically when the station moves into a zone having radio telephone facilities.

It is also an object of the invention to automatically restrict the operation of the indicator to periods when the radio telephone system is not busy.

A further object is to automatically limit the operation of the indicator to periods when the existing signal-to-noise ratio is satisfactory for communication purposes.

An additional object is to discontinue the operation of the radio transmitter on the train by remote control after it has inadvertently been left in operation due to failure to restore the train telephone instrument to its holder.

These and other objects of the invention are attained in a manner now to be described briefly which includes providing a radio terminal station with a low frequency tone for modulating the carrier during idle periods. When the radio station on the train is within range of the terminal station, the tone modulated carrier is received. The low frequency tone is separated by filtering and is employed to effect the energization of a relay which controls the operation of a "telephone service available" indicator. Since the low frequency tone is radiated only during idle periods, its absence during busy periods will prevent the operation of the indicator even though the radio station on the train has moved into the service zone of the terminal radio station. The radio station on the train is also provided with a noise detector circuit which produces a control voltage to prevent the operation of the indicator when the signal-to-noise ratio is not satisfactory for communication purposes. In addition, the radio terminal station is provided with another low frequency tone which is used to modulate the carrier only when the telephone at the station on the train has been left off its holder, thereby creating a busy condition. When the carrier modulated with this second low frequency tone is received at the train station, the tone is separated by filtering and is employed to discontinue the operation of the radio transmitter on the train after it has inadvertently been left in operation due to failure to restore the train telephone instrument to its holder.

These and other features of the invention are more fully discussed in connection with the following detailed description of the drawing, in which.

Figures 1, 3:
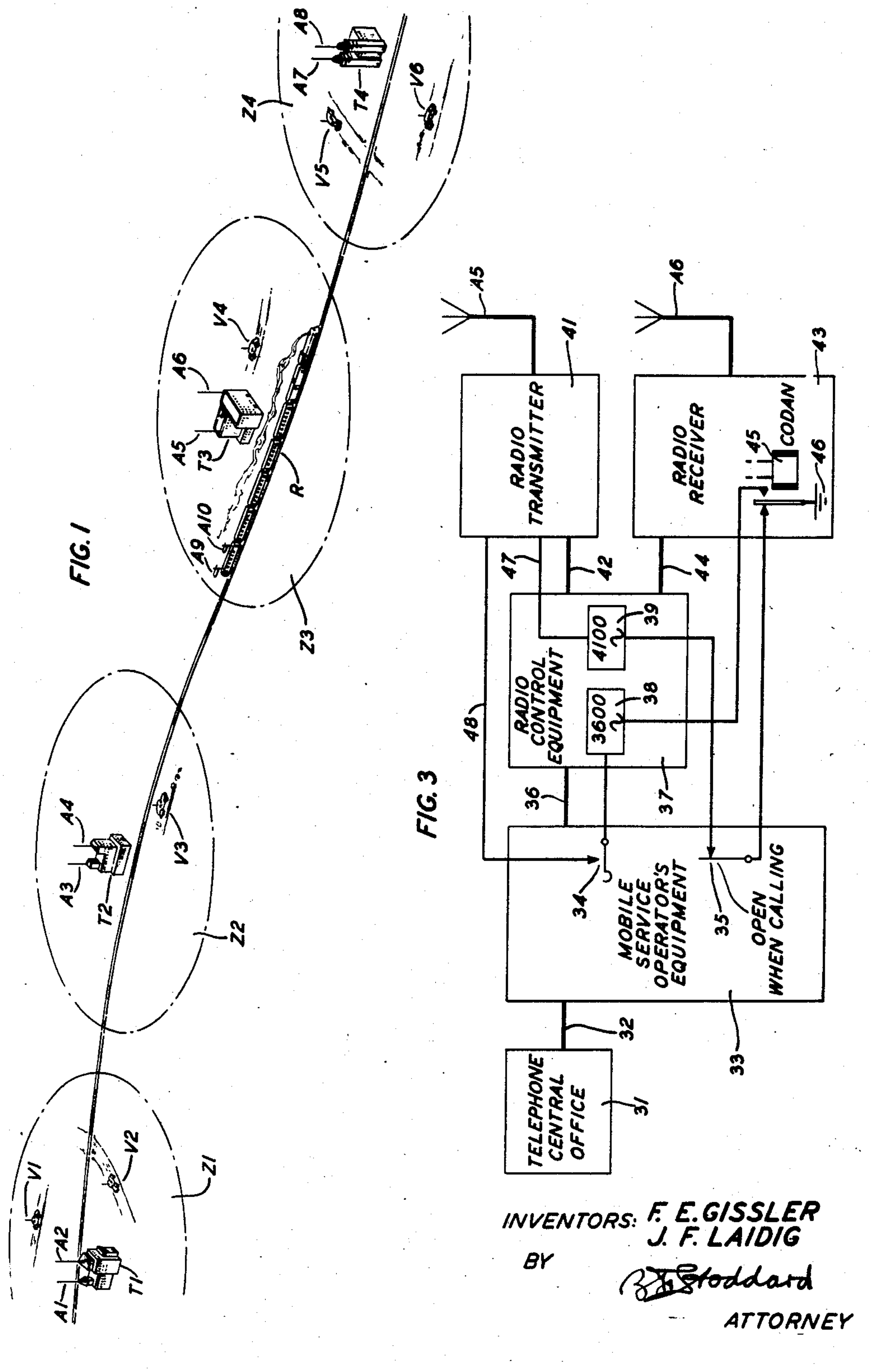
Fig. 1 is a pictorial representation of a radio telephone communication system having a plurality of terminal radio stations and a plurality of mobile radio stations.
Fig. 3 is a schematic representation of the telephone and radio equipment at a terminal radio telephone station.

In Fig. 1, a radio telephone communication system is shown to include four radio telephone transmitting and receiving terminal stations T1, T2, T3, and T4, together with a number of subscribers' stations, some being located in automotive vehicles V1, V2, V3, V4, V5, and V6 and one being located in a railroad passenger train R. Each of these subscribers' mobile stations V1 to V6, inclusive, and R is equipped with radio telephone transmitting and receiving equipment. Each of the terminal stations T1 to T4, inclusive, is provided with both a transmitting antenna A1, A3, A5, and A7, respectively, and also a receiving antenna A2, A4, A6, and A8, respectively. The subscriber's mobile station that is located in the railroad train R, which is the station with which this invention is particularly concerned, is also provided with a transmitting antenna A9 and a receiving antenna A10.

The radio terminal stations T1 to T4, inclusive, employ the well-known line-of-sight method of radio transmission and reception. Thus, each one serves a particular geographic zone Z1, Z2, Z3, and Z4, respectively, having limits determined by the heights of the associated antennas A1 to A8, inclusive, the amount of power radiated and the nature of the terrain. In this particular embodiment of the invention, the railroad train R travels between New York, New York, and Washington, D. C., and the terminal stations T1 to T4, inclusive, are located in the principal cities along the route. Thus, station T1 is located in Washington, D. C.; station T2 is located in Baltimore, Maryland; station T3 is located in Philadelphia, Pennsylvania; and station T4 is located in Newark, New Jersey. As is indicated in Fig. 1, the service zones Z1 to Z4, inclusive, do not overlap. Therefore, as the railroad train R travels along its route, it will leave one service zone and enter a geographic area having no radio telephone facilities. Later, it will leave the "no service available" area and will enter a different zone in which radio telephone service is available. Still later, it will leave this zone and will again travel for some period of time through an area having no radio telephone service available. This procedure is repeated until the train R reaches its final destination.

As the service zones and the "no service" areas have no visible lines of demarcation, it can be understood that it is desirable that the radio telephone station on the train R be equipped with a readily discernible indicator which will be actuated only when the train R is in one of the service zones Z1 to Z4, inclusive. Since, in this embodiment of the invention, the radio telephone station on the train R is an unattended station having a coin box telephone, there is no attendant on the train R who could manually operate the indicator. Therefore, it is necessary that the "telephone service available" indicator be operated automatically whenever the train R enters one of the service zones Z1 to Z4, inclusive. It is also necessary that the operation of the indicator be automatically discontinued whenever the train R leaves one of the service zones Z1 to Z4, inclusive.

The portion of the frequency spectrum that is assigned as a communication channel for use between the radio station on the train R and the terminal stations T1 to T4, inclusive, is the same as that assigned for use between the mobile vehicular radio stations V1 to V6, inclusive, and the terminal stations T1 to T4, inclusive. Due to this common use of the communication channel, when one of the automobile radio stations V1 to V6, inclusive, in one of the service zones Z1 to Z4, inclusive, is using the channel, a passenger on the train R will not be able to use the radio telephone station on the train R if the train R is at that time in the busy zone. Accordingly, it is desirable that the "telephone service available" indicator at the radio station on the train R be automatically controlled so that it will not be operated when the communication channel is being used by another subscriber's radio telephone station in the same zone as that in which the train R is located at a particular time. It is to be noted that, since the system employs the line-of-sight method of radio transmission and reception, use of the common communication channel in one service zone will not prevent it from being available for use independently in another service zone at the same time.

Since the radio telephone station on the train R is unattended, as was stated above, there is no attendant on the train R who can observe transmission conditions to determine whether the instantaneous signal-to-noise ratio is satisfactory for commercial use of the communication system by a passenger on the train R. Consequently, it is advisable that the "telephone service available" indicator at the radio station on the train R be automatically controlled so that it will not be operated when the instantaneous signal-to-noise ratio is not satisfactory for commercial use of the system by a passenger on the train R.

Figure 2:
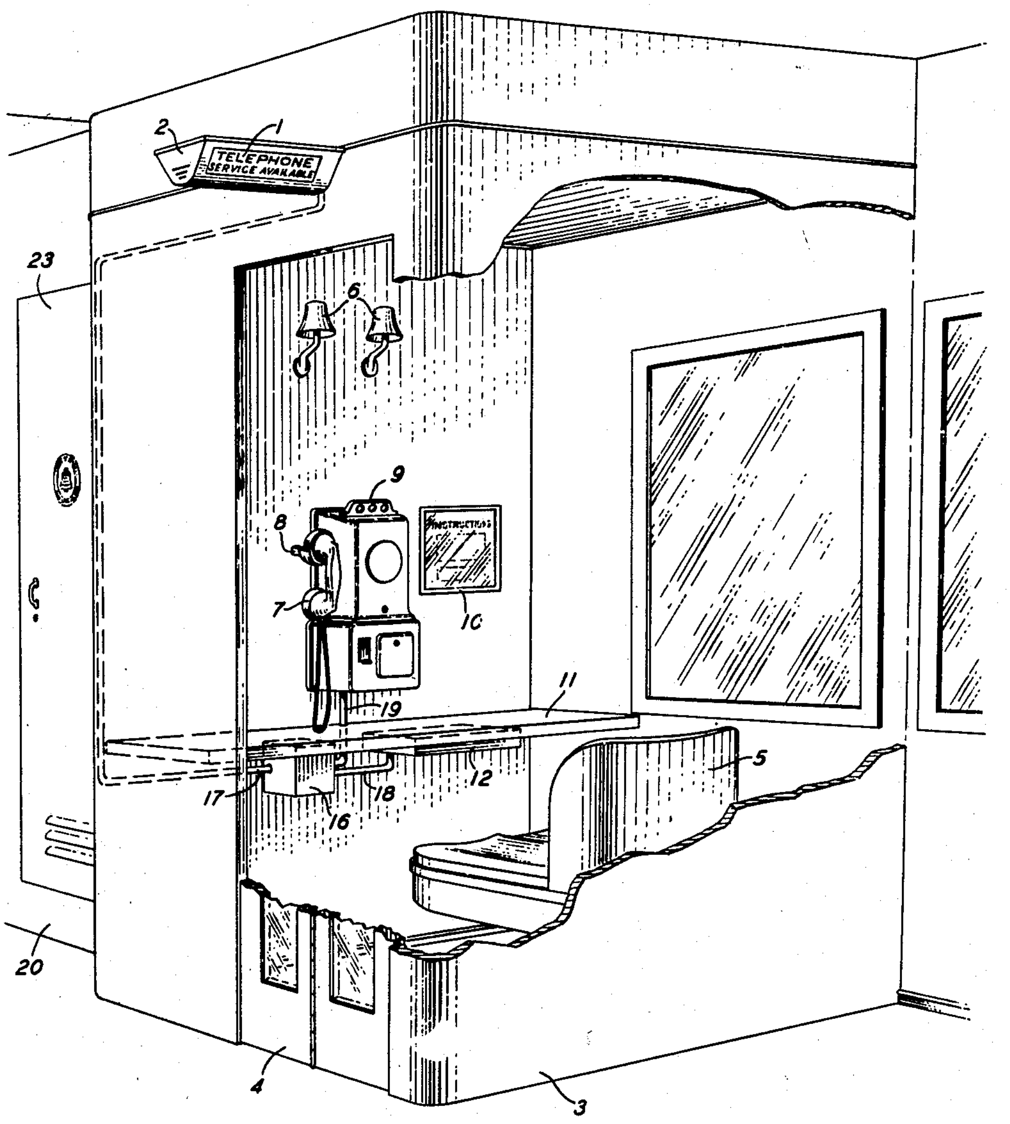
Fig. 2 shows a telephone booth with an unattended coin box telephone and associated radio equipment located on a passenger railroad train.
Figure 5:
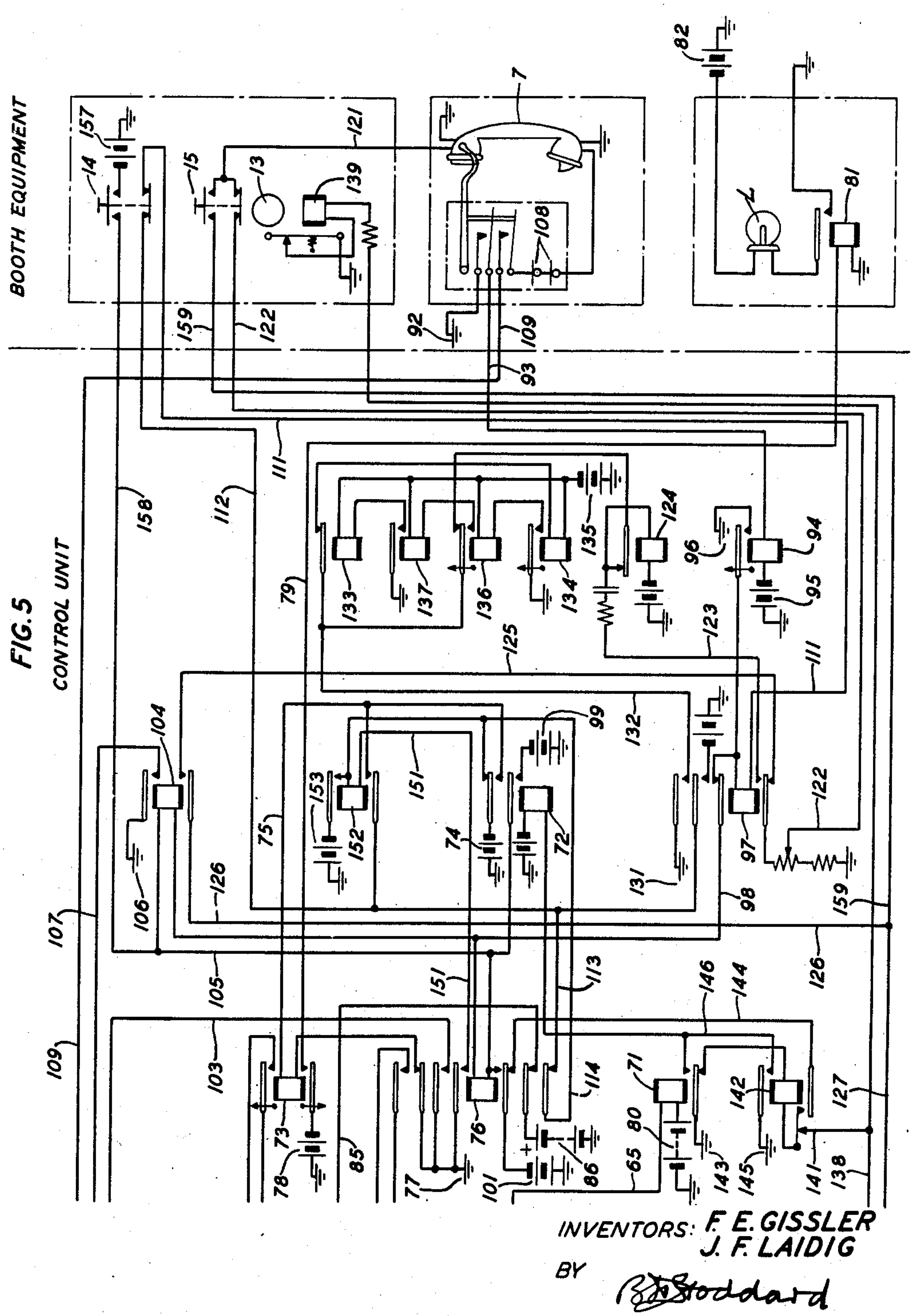
Fig. 5 illustrates the telephone equipment and its associated control equipment at the train radio telephone station.

A "telephone service available" indicator which is operated in accordance with the above-mentioned conditions and requirements is illustrated in Fig. 2, wherein it is shown in the form of a translucent sign 1 mounted in a housing 2. The housing 2 contains a source of illumination, such as an electric lamp L, which is shown in Fig. 5. The electric current for lighting the lamp L is turned off and on in accordance with the above-mentioned conditions by means that are described hereinafter. When the lamp L is not lit, the sign 1 appears to be blank; but, when the lamp L is lit, the words "telephone service available" become clearly visible. The sign 1, together with the housing 2, is mounted in a conspicuous position outside a booth 3.

The booth 3 is situated at a convenient location on the train R, such as in the club car. It is provided with a door 4 and, in addition to a chair 5 and the usual lamps 6, contains a telephone handset 7 adapted to be held by a hook switch 8 mounted on a coin box 9. Instructions for the subscriber's use of this unattended, coin box, radio telephone service are printed on a card 10 attached to a wall of the booth 3. The booth 3 also contains a shelf 11 positioned conveniently beneath the telephone handset 7. A bell box 12 is attached to the bottom surface of the shelf 11 in an inconspicuous position. The bell box 12 contains a bell 13 and two push-button type of switches 14 and 15, these items being shown in Fig. 5. Also attached to the bottom surface of the shelf 11 is a junction box 16 from which three electric conductors 17, 18, and 19 extend. Conductor 17 is connected to the housing 2, conductor 18 is connected to the bell box 12, and conductor 19 is connected to the coin box 9. These three conductors 17, 18, and 19 are cabled together inside the junction box 16, and the resulting cable is passed through an opening in the associated wall of the booth 3 to an adjoining apparatus cabinet 20.

Figure 4:
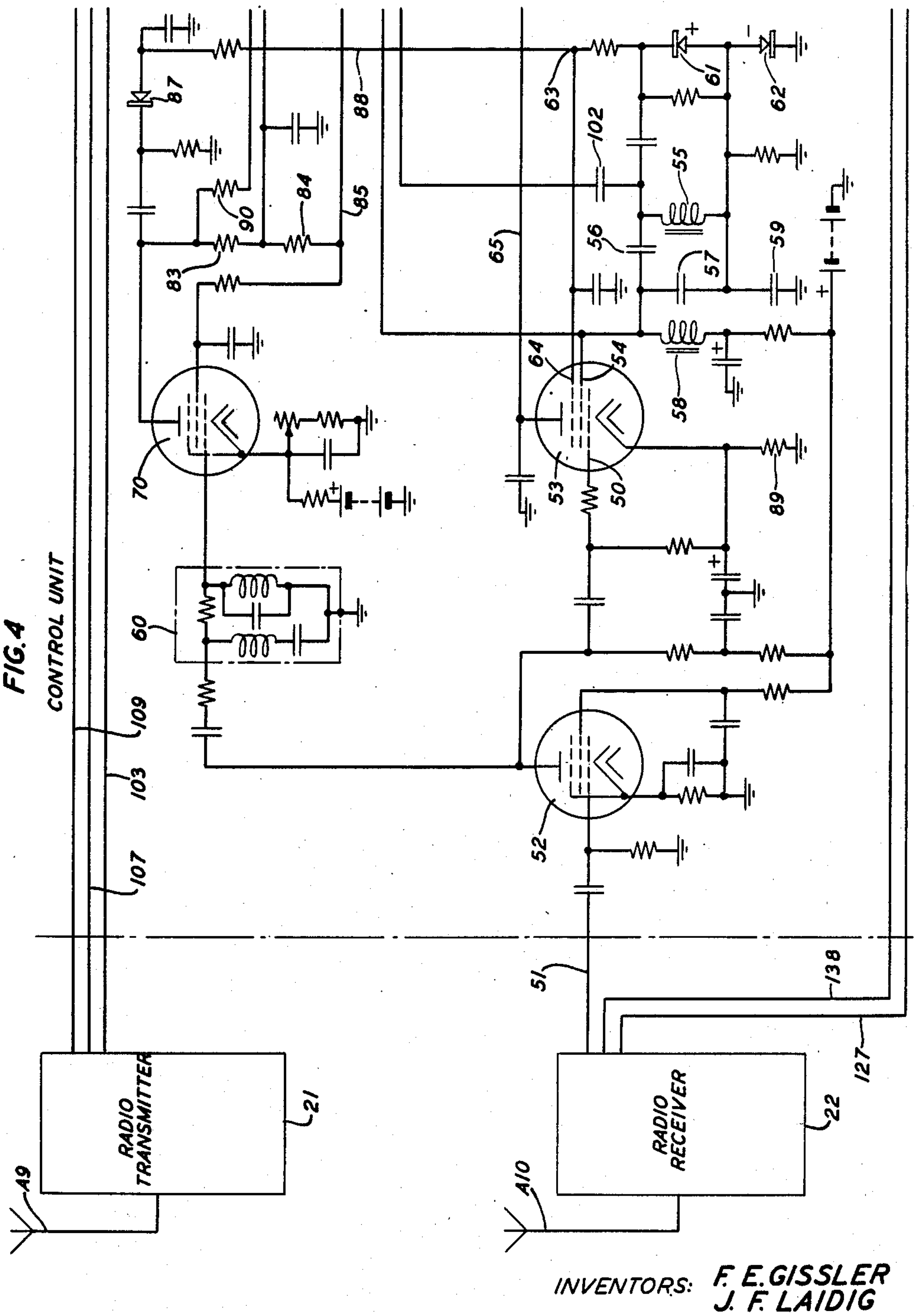
Fig. 4 illustrates the radio equipment and its associated control equipment at the train radio station.

The apparatus cabinet 20 contains a conventional radio transmitter 21 and a conventional radio receiver 22, both of which are indicated schematically in Fig. 4. Also inside the cabinet

CROSS REFERENCE SEARCH ROO 20 is control equipment, shown in detail in Figs. 4 and 5, for controlling the illumination of the sign 1. The cabinet 20 is provided with a door 23 which is normally locked but which may be unlocked when it becomes necessary to inspect, repair, or replace the enclosed equipment.

Fig. 3 represents schematically the arrangement of apparatus and equipment at any one of the terminal stations T1 to T4, inclusive, such as station T3. In Fig. 3, a conventional telephone central office 31 is connected by an electric cable 32 to the usual mobile service operator's position equipment 33 which includes a normally open, manually operable, non-locking switch 34 and a normally closed switch 35 which is automatically opened in a manner well known to those skilled in the art whenever the operator initiates a call. The operator's equipment 33 is connected by an electric cable 36 to the conventional radio control equipment 37 which includes a 3600-cycle tone generator 38 and a 4100-cycle tone generator 39, both of which are of standard design. A conventional radio transmitter 41 having a transmitting antenna A5 is connected by an electric cable 42 to the control equipment 37. Similarly, a conventional radio receiver 43 having a receiving antenna A6 is connected by an electric cable 44 to the control equipment 37. The radio receiver 43 is provided with the usual codan relay 45 which is normally not energized but which, as is well known to those skilled in the art, becomes energized in response to the reception by the receiver 43 of carrier energy. By means of this arrangement of the equipment at the terminal station, a passenger on the railroad train R can call the mobile service operator and be connected to the telephone central office 31 or to any of the mobile vehicular radio stations within that particular zone.

The functions performed by the tone generators 38 and 39 are described hereinafter. It may be noted here, however, that in the idle condition with no carrier energy being received by the antenna A6, the codan relay 45 is not operated, and a circuit is closed from ground 46, over the armature and back contact of relay 45, through switch 35 which is now closed, through the 4100-cycle tone generator 39, and then over conductor 47 to the radio transmitter 41. Thus, in the idle condition, the 4100-cycle tone is applied to the radio transmitter 41 where it is employed to modulate the carrier energy which is generated in the transmitter 41 and radiated by the antenna A5 to the radio station on the railroad train R. This circuit is automatically opened to disable the generator 39 in response to either of two conditions. One of these conditions is the initiation of a call by the service operator, which results in switch 35 being opened automatically. The other condition is the reception of carrier energy by the radio receiver 43 which energizes the codan relay 45 and thereby causes it to operate its armature to its front contact.

It is also to be noted that, in the idle condition, the circuit through the 3600-cycle tone generator is open at both the normally open switch 34 and the front contact of the codan relay 45. When carrier energy radiated from any of the associated subscribers' radio stations is received over the antenna A6, the armature of the codan relay 45 is operated to its front contact to connect ground 46 to the generator 38. Then, when the service operator manually closes the non-locking switch 34, a circuit is closed from ground 46, over the armature and front contact of the codan relay 45, through the 3600-cycle tone generator 38, through switch 34, and then over conductor 48 to the radio transmitter 41. Thus, the generator 38 is substituted for the generator 39 and the 3600-cycle tone is now employed by the radio transmitter 41 to modulate the carrier energy radiated to the radio station on the train R. For a reason explained hereinafter, the switch 34 is closely only momentarily so that the carrier radiated by the antenna A5 is modulated by the 3600-cycle tone for only a brief interval of time.

Referring now to Figs. 4 and 5, which show the equipment at the radio telephone station on the train R, it was stated above that, when the train R enters a service zone, such as the zone Z3, the receiving antenna A10 on the train R will receive the carrier energy that is radiated from the associated radio terminal station T3. It was also stated above that, in the idle condition, the carrier is modulated with a 4100-cycle tone. From the antenna A10 on the train R, the tone modulated carrier energy received by the antenna A10 on the train R is delivered to the radio receiver 22, which is located in the apparatus cabinet 20, shown in Fig. 2, in the club car of the passenger railroad train R. In the radio receiver 22, the tone modulated carrier energy is demodulated in a well-known manner and is converted to audio frequencies. The audio frequency output from the receiver 22 is supplied over a conductor 51 to the control grid of a thermionic amplifier 52. A portion of the plate output from amplifier 52 is coupled over an obvious circuit to the control grid 50 of a combined amplifier and trigger tube 53.

In tube 53, the screen grid 54 functions as a plate for the control grid 50 and the cathode. The screen grid 54 is provided with two resonant circuits. One of these circuits, consisting of coil 53 and capacitors 56 and 57, is tuned to 4100 cycles. The other of these resonant circuits, consisting of coil 58 and capacitors 57 and 59, is tuned to approximately 2050 cycles. The voltages across these resonant circuits are separately rectified by rectifiers 61 and 62, respectively. The rectifiers 61 and 62 may be of any suitable type, such as germanium diodes, and are so arranged that their outputs are connected in series opposition to the junction point 63. The net output of the rectifiers 61 and 62 is connected over an obvious circuit from the junction point 63 to the suppressor grid 64 of tube 53. The voltage thus applied to the suppressor grid 64 functions as a control trigger voltage for the purpose of controlling the conductivity of the cathode-anode circuit of the tube 53.

For example, if the output of tube 52 consists chiefly of the 4100-cycle tone, the output from rectifier 61 will predominate and a positive voltage will be applied to the suppressor grid 64 with the result that the cathode-anode circuit of the tube 53 will be rendered conductive. On the other hand, during busy periods when speech energy centering around 2050 cycles may be applied to the tube 52, the output of the tube 52, in addition to containing energy of 2050 cycles, may also contain harmonic energy centering around 4100 cycles. When energy centering around these two frequencies is applied to the tube 53, the screen grid 54 will deliver this energy to the above-mentioned resonant circuits with the result that the rectifier 62 will rectify the speech energy of 2050 cycles and rectifier 61 will rectify the harmonic energy of 4100 cycles. Since the rectifiers are connected in series opposition, the net voltage applied from the junction point 63 to the suppressor grid 64 will either be negative or zero or at least not sufficiently positive to render the cathode-anode circuit of tube 53 conductive. This insures that the cathode-anode circuit of the tube 53 will be rendered conductive only in response to the reception of the 4100-cycle tone.

As was stated above, since there is no attendant on the train R who can measure the instantaneous signal-to-noise ratio, it is necessary that this be performed automatically so that the sign 1, shown in Fig. 2, will not be illuminated when the instantaneous signal-to-noise ratio is not satisfactory for commercial use of the system. Accordingly, a portion of the plate output from amplifier 52 is coupled over an obvious circuit to a filter 60 having a low-pass characteristic essentially flat from 200 to 2000 cycles. The output of the filter 60 is connected to the control grid of an amplifier 70 having its plate supply derived over a circuit extending through the resistors 83 and 84, along a conductor 85, over the middle bottom armature and contact of non-operated relay 76, and then to battery 86.

The amplified noise currents are rectified by a rectifier 87, which may be of any suitable type such as a germanium diode, to produce a voltage that is negative with respect to ground. This negative voltage is applied over a conductor 88 to the junction point 63 where it is combined with the net positive voltage produced by the rectification of the 4100-cycle tone. If the resulting voltage thus applied to the suppressor grid 64 is negative with respect to ground or is less than approximately three volts positive with respect to ground, the cathode-anode circuit of tube 53 will either be non-conductive or not sufficiently conductive to accomplish any further circuit operations. However, if the resulting voltage is aproximately three or more volts positive with respect to ground, the cathode-anode circuit of tube 53 will become sufficiently conductive to complete a path extending from ground 89, through the cathode-plate circuit of tube 53, out over conductor 65, through the winding of relay 71, and then to battery 80. The closing of this path serves to energize the relay 71 which thereupon operates its armature to its front contact to complete an obvious circuit for energizing relay 72 and causing it to operate its armatures. It is to be noted that the pass-band of the filter 60 is selected to be within the speech frequency range in order that this portion of the frequency spectrum may be automatically examined in order to prevent the initiation of the transmission of speech energy when unfavorable noise conditions exist.

The operation of the top armature of relay 72 completes a circuit for energizing relay 73, this circuit extending from battery 74, top armature and make contact of relay 72, over conductor 75 to relay 73, through the winding of relay 73, and then over the top unoperated armature and contact of relay 76 to ground 77. When relay 73 thus becomes energized, it operates its armatures. The operation of the bottom armature of relay 73 closes a circuit for current from battery 78 to flow along conductor 79 to energize relay 81. Upon being energized, relay 81 operates its armature to close a circuit for current to flow from a source of power supply, such as the battery 82, through the lamp L thereby lighting the lamp L.

Since the lamp L, as was stated above, is located in the housing 2, shown in Fig. 2, the lighting of the lamp L will cause the words "telephone service available" on the sign 1, also shown in Fig. 2, to become clearly visible. This serves to indicate to passengers on the railroad train R that the train has entered a service zone having radio telephone facilities, that the assigned communication channel is idle, and that the instantaneous signal-to-noise ratio is satisfactory for commercial use of the assigned communication channel.

If the magnitude of the noise energy should increase to such an extent as to cause the rectifier 87 to produce a negative voltage that is sufficiently large to cause the cathode-anode circuit of the tube 53 to become non-conductive, then relay 71 will release its armature thereby causing the release of the armatures of relay 72 which, in turn, effects the release of the armatures of relay 73. The release of the armature of relay 73 causes relay 81 to release its armature thereby extinguishing the lamp L and causing the sign 1 to appear to be blank, as was mentioned above, thus indicating that the system is not in condition for use by a passenger on the train.

In order to prevent the lamp L from flickering off and on due to borderline conditions, once the lamp L has been lit the noise amplifier 70 is degraded a small amount. This is effected when relay 73 first becomes energized and operates its top armature to connect resistor 90 in parallel with resistor 83 thereby reducing the gain of the noise amplifier 70 and allowing the circuit signal-to-noise ratio to degrade by a predetermined number of decibels before the cathode-anode circuit of tube 53 is rendered non-conductive. This produces a hysteresis effect in the determination of the signal-to-noise operate and release points thereby improving the stability of the operation of the sign 1.

Assuming that the lamp L is lit and that a passenger wishes to make a call, he enters the booth 3, shown in Fig. 2, and removes the telephone handset 7 from its hook switch 8 thereby closing the hook switch contacts. Closure of the top hook switch contact completes a circuit from ground 92, over conductor 93, through the winding of relay 94, and then to battery 95. This energizes relay 94 which operates its armature to complete a circuit extending from ground 96, over the inner top armature and contact of non-operated relay 97, along conductor 98, through the winding of relay 76, and then over the operated inner top armature and contact of relay 72 to battery 99. Relay 76 now becomes energized and operates its armatures, the inner bottom armature closing a locking-up path to battery 101. Operation of the next to the top armature opens the energizing circuit of relay 73 and causes it, in turn, to open the energizing circuit of relay 81 thereby extinguishing the lamp L. Operation of the outer top armature connects capacitor 102 in parallel with capacitor 56 thereby changing the resonant frequency of the associated tuned circuit from 4100 cycles to 3600 cycles for a purpose explained hereinafter. Operation of the middle bottom armature disconnects battery 86 from the plate of the noise amplifier 70. Operation of the next to the lowest top armature applies ground 77 over conductor 103 to control equipment in the radio transmitter 21 for conditioning it for operation. At the same time, a circuit is closed from ground 96, over the armature and contact of relay 94, along conductor 98, through the winding of relay 104,

CROSS REFERENCE then along conductor 105, and over the inner operated armature of relay 72 to battery 99. Relay 104 consequently becomes energized and operates its top armature to apply ground 106 over conductor 107 to a control circuit in the radio transmitter 21 for the purpose of starting its dynamotor. The transmitter 21 is thus placed in operation and radiates its assigned carrier energy out over the transmitting antenna A9. At the same time, the energization of relay 104 completes a circuit extending from the receiver of the telephone handset 7 along conductor 121, over the normally closed contacts of the monitoring switch 15, along conductor 122, over the released bottom armature of relay 97, along conductor 125, over the bottom operated armature of relay 104, down along conductor 126, and then over conductor 127 to the conventional audio output circuits in the radio receiver 22.

The calling passenger now gives the mobile service operator at the associated terminal radio station the number of the party he is calling. The service operator, in turn, informs the calling passenger of the amount charged for the call. The passenger then deposits the required coins in the coin box 9, shown in Fig. 2, where they actuate the coin transmitters 108 which are connected over the operated bottom hook switch contacts and along conductor 109 to the radio transmitter 21. The service operator then completes the connection and the passenger proceeds with his call.

At the completion of his call, the passenger replaces the telephone handset 7 on the hook switch 8 thereby opening the hook switch contacts. This opens the energizing circuit of relay 94 which releases its armature thereby effecting the release of the armatures of relays 76 and 104. The release of the next to the lowest top armature of relay 76 removes ground 77 from conductor 103 leading to control equipment in the radio transmitter 21. The release of the top armature of relay 104 removes ground 106 from conductor 107 leading to the dynamotor control circuit in the radio transmitter 21. The removal of grounds 77 and 106 from conductors 103 and 107 stops the dynamotor in the radio transmitter 21, effects the termination of the transmission of carrier energy, and restores the radio transmitter 21 to its idle condition.

In the event that the passenger should attempt to make a call when the lamp L is not lit, removal of the handset 7 from the hook switch 8 would effect the operation of the armature of relay 94 in the manner described above. However, since relays 71 and 72 are not energized at this time, a path is now closed from ground 96, through the winding of relay 97, along conductor 111, normally closed contacts of the emergency switch 14, along conductor 112, over conductor 113, released outer bottom armature of relay 76, along conductor 114, and then over the released top armature of relay 72 to battery 74. This serves to energize relay 97 which operates its armatures and connects the receiver of the handset 7 along conductor 121, over the normally closed contacts of the monitoring switch 15, along conductor 122, over the operated bottom armature of relay 97, and then along conductor 123 to the buzzer 124. Thus the receiver 7 is disconnected from the circuit leading to the audio output of the radio receiver 22 and the passenger is prevented from listening to a call that might be in progress between other stations, such as the vehicular stations V1 to V6, inclusive, shown in Fig. 1.

The operation of the outer top armature of relay 97 connects ground 131 over conductor 132, along the armature of relay 133, and then through the winding of relay 134 to battery 135. This causes relay 134 to operate its armature which causes relay 136 to become energized over an obvious circuit. Relay 136 now operates its armature which closes a circuit for energizing relay 137 which, in turn, closes a circuit for energizing relay 133. When relay 133 now operates its armature, it opens the energizing circuit of relay 134. Relay 134 is of the slow-to-release type and does not release its armature for 125 milliseconds. Relay 136, which is also of the slow-to-release type, now releases its armature after a 125-millisecond delay. This causes the buzzer 124 to operate until relays 137 and 133 have released and relays 134 and 136 have operated. The operate time and the release time of the buzzer 124 are equal since these times depend on the release time of relays 133 and 137 and the operate time of relays 134 and 136 in one instance and on the operate time of relays 133 and 137 and the release time of relays 134 and 136 in the other instance. Thus, when the buzzer 124 is operating, a tone at the buzzer frequency will be heard in the receiver of the handset 7.

When the service operator at the terminal station wishes to call the mobile station on the train, the conventional selective calling signal is transmitted from the terminal station. This signal is received at the radio receiver 22 and operates the usual selector which applies electric current over conductor 138 to the ringer 139 located in the bell box 12 shown in Fig. 2. The ringer 139 functions in the usual manner to ring the bell 13. At the time that the service operator initiates the call, the switch 35 shown in Fig. 3 is automatically opened, as was described above, thereby discontinuing the transmission of the 4100-cycle idle tone which, in turn, causes relay 71 to release its armatures. Since this tends to prevent the radio transmitter 21 from being placed in operation when the call is answered by the removal of the handset 7 from the hook switch 8, a portion of the current from conductor 138 is supplied over conductor 141 to the make-before-break contacts associated with the bottom armature of relay 142. This current passes through the winding of relay 142 and then over the released armature of relay 71 to ground 143 thereby energizing relay 142. Relay 142 now operates its armatures and locks up over a path from ground 143, released armature of relay 71, winding of relay 142, bottom armature of relay 142, along conductor 144, and then over the released inner bottom armature of relay 76 to battery 101. The operation of the top armature of relay 142 closes an obvious circuit from ground 145 over conductor 146 to energize relay 72. The resulting operation of the armatures of relay 72 places the system in the condition described above for starting the radio transmitter 21 in response to the removal of the handset 7 from the hook switch 8.

There may be occasions when a passenger, after making a call, forgets to replace the telephone handset 7, on the hook switch 8 and, instead, inadvertently leaves it resting on the shelf 11 shown in Fig. 2. This is a serious departure from the proper operating procedure because, as was described above, the circuit is designed to cause the carrier to be radiated from the radio transmitter 21 when the handset 7 is off the hook switch 8. With the carrier thus being radiated from the transmitting antenna A9, it will be received by the receiving antenna A6 at the terminal station and will actuate the radio receiver 43 to cause a calling indicator to be operated in a well-known manner at the service operator's position. When the occurrence of this condition is recognized by the service operator answering the call indicator without obtaining any response, the service operator operates the non-locking key 34 momentarily to complete the circuit for applying the 3600-cycle tone generator to the radio transmitter 41 as was described above.

The carrier modulated with the 3600-cycle tone is received at the radio receiver 22 on the train where it is demodulated and applied over conductor 51 to the tone amplifier 52, which in turn, applies it to the control grid of the tube 53. Since relay 76 is now operated, due to the handset 7 being off the hook switch 8, condenser 102 is connected in parallel with condenser 56, as was described above, with the result that the associated resonant circuit including coil 55 is now tuned to 3600 cycles. Consequently, the rectifier 61 will now apply a positive voltage to the suppressor grid 64 thereby rendering the anode-cathode circuit of tube 53 conductive. It should be noted that, since relay 76 is now operated, battery 86 is disconnected from conductor 85 leading to the noise amplifier 70 which is consequently disabled with the result that no opposing voltage from the rectifier 87 will be applied over conductor 88 to the junction point 63 at this time. When the anode-cathode circuit of tube 53 is now rendered conductive, it effects the energization of relay 71 which operates its armature. This causes relay 72 to operates its armatures in the manner described above. Prior to this energization of relay 72, the operation of relay 76 had closed a circuit extending from ground 77, over the operated inner top armature of relay 76, along conductor 151, through the winding of relay 152, and then over the released top armature of relay 72 to battery 74. This had energized relay 152 which had operated its armatures and had locked up over a path extending from battery 153, top operated armature of relay 152, winding of relay 152, conductor 151, and then over the operated inner top armature of relay 76 to ground 77.

Consequently, when relay 72 now becomes energized, it closes a circuit extending from battery 74, over the operated top armature of relay 72, over the operated bottom armature of relay 152, then along conductor 112, over the normally closed contacts of the emergency switch 14, along conductor 111, through the winding of relay 97, and then over the operated armature of relay 94 to ground 96. This effects the energization of relay 97 and causes it to operate its armatures. The operation of the inner top armature of relay 97 opens the previously described energizing circuit of relays 76 and 104 which thereupon release their armatures. The release of the next to the lower top armature of relay 76 disconnects ground 77 from conductor 103 thereby discontinuing the operation of the radio transmitter 21 and stopping the radiation of its carrier energy. At the same time, the operation of the bottom armature of relay 97 disconnects the telephone receiver in the telephone instrument 7 from the conductor 127 leading to the audio output circuit of the radio receiver and connects the telephone receiver in the telephone instrument 7 to the output circuit of the buzzer 124. The operation of the outer top armature of relay 97 starts the operation of the buzzer 124 in the manner described above.

Since no carrier energy is now being radiated by the antenna A9, the codan relay 45 at the terminal station releases its armature to close the circuit for applying the 4100-cycle tone to the transmitter 41. The resulting tone modulated carrier will be received by the radio receiver 22 and will again effect the lighting of the lamp L in the manner previously described. If a passenger on the train sees the "telephone service available" sign 1 illuminated and enters the booth 3, he will find the telephone instrument 7 resting on the shelf 11. Upon picking it up, he will hear the busy tone produced by the buzzer 124. In accordance with the instructions printed on the card 10 shown in Fig. 2, the passenger replaces the telephone handset 7 on the hook switch 8 thereby opening the hook switch contacts. The opening of the upper set of hook switch contacts opens the energizing circuit of relay 94 which releases its armature thereby opening the energizing circuit of relay 97 and causes it to release its armatures. When relay 97 now releases its armatures, it discontinues the operation of the buzzer 124, disconnects the telephone receiver in the telephone instrument 7 from the output circuit of the buzzer 124, and restores the remainder of the station equipment to its normal idle condition. The passenger then removes the telephone handset 7 from the hook switch 8 and proceeds to make his call in the normal manner described above.

If an emergency arises, and the conductor on the train wishes to make a call but, upon lifting the telephone handset 7 hears a busy tone, he momentarily operates the emergency push button 14. This opens the normally closed lower set of push button contacts which, in turn opens the energizing circuit of relay 97 thereby discontinuing the operation of the buzzer 124. At the same time, the normally open upper set of push button contacts becomes closed thereby closing a circuit extending from battery 157 through the now closed upper set of push button contacts of switch 14, along conductors 158 and 105, through the windings of relays 104 and 76 in parallel, along conductor 98, over released inner top armature of relay 97, and then over the operated armature of relay 94 to ground 96. This energizes relays 104 and 76 which operate their armatures and lockup from battery 101, over the inner bottom armature of relay 76, through the winding of relay 76, and then along conductor 98 to ground 96. This starts the transmitter 21 in the manner described above so that the train conductor can now proceed with his call.

Periodically, a telephone maintenance man will board the train to inspect the radio telephone equipment and to make any repairs or adjustments that may be necessary. There may be occasions when these inspections will be made when the train is in a storage yard at night and no idle tone is being transmitted from the associated terminal radio station and, consequently, relay 76 will not be energized. Under this condition, when the maintenance man lifts the telephone handset 7 off the hook switch 8, relays 94 and 97 will become energized over the circuits described above to operate the buzzer 124 and to connect the telephone handset to the output circuit of the buzzer 124. Upon hearing this busy tone, the maintenance man momentarily operates the monitoring push button switch 15 to close its normally open upper set of contacts thereby connecting the telephone receiver in the telephone instrument 7 over conductors 121 and 159 to conductor 127 leading to the audio output circuit of the radio receiver 22. If the maintenance man determines by listening that the communication channel is busy, he waits until it is idle. When it becomes idle, he momentarily operates the emergency push button switch 14 which places the radio transmitter 21 in operation in the manner described above. Carrier energy is now radiated from the antenna A9 and the maintenance man proceeds with his call.

It is to be understood that the invention has been shown and described with reference to a specific embodiment for the purpose of explaining the principles and features of operation and that various modifications may be made without departing from the scope of the invention which is to be limited only by the claims appended hereto.

What is claimed is:

1. A passenger vehicle radio telephone station comprising a radio transmitter and a radio receiver carried by a passenger vehicle for the transmission and reception of intelligence signals, a telephone instrument connectible to said transmitter and said receiver, holding means for holding said instrument during idle periods, a booth carried by the vehicle for enclosing said telephone instrument, an indicating sign affixed to said booth, a lamp for illuminating said sign, a lighting circuit for lighting the lamp, frequency selective means for effecting the closing of said lighting circuit, said frequency selective means being actuated by the reception by the radio receiver of electric energy of a preassigned frequency during idle periods when no intelligence signals are being received by said receiver, noise responsive means for effecting the opening of said lighting circuit, said noise responsive means being actuated by the reception by the radio receiver of noise energy having a magnitude exceeding a preassigned critical value, and electroresponsive means actuated by the removal of said instrument from said holding means for opening said lighting circuit.

2. A passenger vehicle radio telephone station in accordance with claim 1 in which said frequency selective means comprise a resonant circuit, a first rectifying device coupled to the output of said resonant circuit, a second rectifying device coupled to the output of said noise responsive means, first circuit means for coupling the outputs of said rectifying devices in series opposition to produce a resultant voltage, a thermionic tube having a plurality of electrodes, and second circuit means for applying said resultant voltage to one of said electrodes.

3. A passenger vehicle radio telephone station in accordance with claim 2 and having third circuit means for coupling a second one of said electrodes to the input of said resonant circuit.

4. A passenger vehicle radio telephone station in accordance with claim 3 and having fourth circuit means for coupling the output of said radio receiver to a third one of said electrodes for controlling the conductivity of the space path between a fourth one of said electrodes and the second one of said electrodes, the conductivity of the space path between said fourth electrode and a fifth one of said electrodes being controlled by said first-mentioned electrode.

5. A passenger vehicle radio telephone station in accordance with claim 2 in which said frequency selective means comprise a second resonant circuit, a third rectifying device coupled to the output of said second resonant circuit, and coupling means for coupling the output of said third rectifying device and the output of said first-mentioned rectifying device in series opposition.

6. A passenger vehicle radio telephone station in accordance with claim 5 in which said first-mentioned resonant circuit is tuned to a frequency in the higher portion of the speech frequency spectrum, said second resonant circuit being tuned to a frequency in the intermediate portion of the frequency spectrum, and said noise responsive means including a low-pass filter having its pass-band located in the lower portion of the frequency spectrum.

7. A radio telephone station comprising in combination a radio transmitter adapted to radiate carrier energy, a radio receiver adapted to receive carrier energy, a telephone instrument connectible to said transmitter and said receiver for the transmission and reception of intelligence signals, holding means for holding said instrument during idle periods, an electroresponsive indicator associated with said telephone instrument, an energizing circuit for actuating said indicator, frequency selective means for effecting the closing of said energizing circuit, said frequency selective means being actuated by the reception by the radio receiver of electric energy of a preassigned frequency during idle periods when no intelligence signals are being received by said receiver, noise responsive means for effecting the opening of said energizing circuit, said noise responsive means being actuated by the reception by the radio receiver of noise energy having a magnitude exceeding a preassigned critical value, and first electroresponsive means actuated by the removal of said instrument from said holding means for conditioning said radio transmitter for operation and for opening said energizing circuit.

8. A radio telephone station in accordance with claim 7 in which said preassigned frequency lies within the higher portion of the speech frequency spectrum, said noise responsive means including a low-pass filter having a flat characteristic and having its pass-band located in the lower portion of the speech frequency spectrum.

9. A radio telephone station in accordance with claim 7 and having second electroresponsive means for reducing said preassigned critical value substantially simultaneously with the closure of said energizing circuit.

10. A radio telephone station in accordance with claim 7 in which said frequency selective means include two resonant circuits, one tuned to a fundamental frequency and the other tuned to a harmonic of said fundamental frequency, a first rectifier for rectifying the output of one of said resonant circuits, a second rectifier for rectifying the output of the other of said resonant circuits, means for connecting the outputs from said rectifiers in series opposition to produce a resultant voltage, a thermionic tube having a suppressor grid and a screen grid, first circuit means for coupling said screen grid to the inputs of said resonant circuits, and second circuit means for applying said resultant voltage to said suppressor grid.

11. A radio telephone station in accordance with claim 10 and having tuning means controlled by said first electroresponsive means for tuning one of said resonant circuits to a different frequency.

12. A radio telephone station in accordance with claim 10 in which said noise responsive means includes a filter, an amplifier coupled to the output of the filter, a third rectifier coupled to the output of the amplifier for rectifying its output energy, and third circuit means for combining the output from said third rectifier with said resultant voltage for application to said suppressor grid.

13. A radio telephone station in accordance with claim 12 and having fourth circuit means controlled by said second electroresponsive means for degrading said amplifier by a preassigned amount.

14. In a radio telephone communication system for providing radio telephone communication service for passengers on a vehicle traveling through a number of geographic zones, some having radio telephone service facilities and others having no radio telephone service facilities, a radio telephone station on said vehicle, said station comprising a telephone instrument and holding means for holding said instrument during idle periods, indicating means for informing the passengers that the vehicle is traveling through a radio telephone service zone, said indicating means comprising an indicator carried by the vehicle, a source of electric energy, an energizing circuit for connecting said source to the indicator for actuating said indicator, first electroresponsive means for effecting the opening and closing of said energizing circuit, a frequency responsive circuit responsive to electric energy of a preassigned frequency for effecting the control of the operation of said first electroresponsive means, radiating means in each of said radio telephone service zones for radiating carrier energy modulated only with electric energy of said preassigned frequency, receiving means on the vehicle for receiving the modulated carrier energy that is radiated in the zone through which the vehicle is traveling, demodulating means for demodulating said received modulated carrier energy, circuit means for applying demodulated energy of said preassigned frequency to said frequency responsive circuit, and second electroresponsive means actuated by the removal of said instrument from said holding means for effecting the opening of said energizing circuit.

15. In a radio telephone communication system in accordance with claim 14 and having third electroresponsive means for discontinuing in the zone through which the vehicle is traveling the modulation of said carrier energy with electric energy of said preassigned frequency, said third electroresponsive means being actuated by the removal of the telephone instrument from said holding means.

16. In a radio telephone communication system in accordance with claim 14 in which said radio telephone station includes a radio transmitter adapted to radiate carrier energy, and starting means for effecting the radiation of carrier energy by said transmitter, said starting means being actuated by the removal of said telephone instrument from said holding means, said radio telephone service facilities including receiving means for receiving said carrier energy radiated by said transmitter and also including an electroresponsive instrumentality for discontinuing within the service zone in which the vehicle is traveling the modulation of carrier energy with electric energy of said preassigned frequency, said electroresponsive instrumentality being actuated by the reception by said receiving means of carrier energy radiated by said radio transmitter.

17. In a radio telephone communication system comprising in combination a terminal radio station and a subscriber's radio station, said subscriber's station including a radio receiver, a telephone instrument, a holder for holding said instrument during idle periods, a radio transmitter, a control circuit for effecting the energization of said transmitter, an instrumentality for opening said control circuit for effecting the deenergization of said transmitter, said instrumentality being actuated in response to the holding of said telephone instrument by said holder, said system being characterized by having control means for actuating said instrumentality during periods when the telephone instrument is removed from said holder, said control means comprising radiating means at said terminal station for radiating carrier energy modulated with electric energy of a preassigned frequency, and electroresponsive means at said subscriber's station, said electroresponsive means being actuated by the reception of said modulated carrier energy by said radio receiver for effecting the actuation of said instrumentality.

18. In a radio telephone communication system in accordance with claim 17 and having an electroresponsive alarm device at said subscriber's station, said alarm device having an output circuit, and additional electroresponsive means at said subscriber's station for initiating the operation of said alarm device and for electrically connecting said telephone instrument to said alarm output circuit, said additional electroresponsive means being actuated by the reception of said modulated carrier energy by said radio receiver during periods when said telephone instrument is removed from said holder.

19. In a radio telephone communication system in accordance with claim 17 and having additional electroresponsive means at said subscriber's station for closing said control circuit for effecting the energization of said radio transmitter, said radio transmitter being adapted to radiate carrier energy upon being energized, receiving means at said terminal station for receiving the carrier energy radiated by said radio transmitter, a control electroresponsive device at said terminal station for discontinuing the modulation of carrier energy at said terminal station with electric energy of said preassigned frequency, said control electroresponsive device being actuated by the reception by said receiving means of carrier energy radiated by said radio transmitter.

20. A radio telephone communication system in accordance with claim 17 and having a circuit for modulating the carrier energy radiated from said terminal station with electric energy of a second preassigned frequency different from said first mentioned preassigned frequency, said circuit being opened by the actuation of said electroresponsive means, and an additional instrumentality for alternatively opening said circuit for discontinuing the modulation of said carrier energy with electric energy of said second preassigned frequency.

21. A radio telephone communication system in accordance with claim 20 in which said first mentioned preassigned frequency and said second preassigned frequency are both within the speech frequency spectrum.

22. A radio telephone communication system comprising in combination a terminal radio station and a subscriber's radio station, said subscriber's station including a radio receiver, a telephone instrument, holding means for holding said instrument during idle periods, a radio transmitter adapted to radiate carrier waves when energized, control circuit means for controlling the energization of said transmitter, first electroresponsive means actuated by the removal of said instrument from said holding means for closing said control circuit means for effecting the energization of said transmitter, radiating means at said terminal station for radiating carrier waves, first modulating means at said terminal station for modulating the carrier waves radiated therefrom with electric energy of a first assigned frequency, second electroresponsive means at said subscriber's station actuated by the reception of said modulated carrier waves by said receiver during periods when the telephone instrument is removed from said holding means for opening said control circuit means for effecting the deenergization of said transmitter, and second modulating means at said terminal station actuated by the deenergization of said transmitter for modulating the carrier waves radiated from the terminal station with electric energy of a second assigned frequency.

23. A radio telephone communication system comprising in combination a terminal radio station and a subscriber's radio station, said subscriber's station including a radio receiver, a telephone instrument, holding means for holding said instrument during idle periods, a radio transmitter adapted to radiate carrier waves when energized, control circuit means for controlling the energization of said transmitter, first electroresponsive means actuated by the removal of said instrument from said holding means for closing said control circuit means for effecting the energization of said transmitter, radiating means at said station for radiating carrier waves, first modulating means at said terminal station for modulating the carrier waves radiated therefrom with electric energy of a first assigned frequency, second electroresponsive means at said subscriber's station actuated by the reception of said modulated carrier waves by said receiver during periods when the telephone instrument is removed from said holding means for opening said control circuit means for effecting the deenergization of said transmitter, an electroresponsive alarm device at said subscriber's station, said alarm device having an output circuit, third electroresponsive means at said subscriber's station actuated by the reception of said modulated carrier waves by said receiver during periods when the telephone instrument is removed from said holding means for initiating the operation of said alarm device and for electrically coupling said telephone instrument to said alarm output circuit, and fourth electroresponsive means actuated by the holding of said telephone instrument by said holding means for discontinuing the operation of said alarm device.

FRANK E. GISSLER.
JOHN F. LAIDIG.

REFERENCES CITED

The following references are of record in the file of this patent:

UNITED STATES PATENTS

| Number | Name | Date |
|---|---|---|
| 1,949,136 | Adair | Feb. 27, 1934 |
| 2,007,399 | Koch | July 9, 1935 |
| 2,379,799 | Haigis | July 3, 1945 |
| 2,392,672 | Koch | Jan. 8, 1946 |
| 2,393,291 | Clark | Jan. 22, 1946 |
| 2,459,105 | Halstead | Jan. 11, 1949 |
| 2,479,305 | Brown | Aug. 16, 1949 |
| 2,501,091 | Preston et al. | Mar. 21, 1950 |
| 2,501,986 | Brockman | Mar. 28, 1950 |
| 2,523,914 | Molnar | Sept. 26, 1950 |